United States Patent [19]
Gordon et al.

[11] Patent Number: 5,899,018
[45] Date of Patent: May 4, 1999

[54] DEVICE AND METHOD FOR TERMITE DETECTION AND CONTROL

[76] Inventors: Glenn D Gordon; Julie M. Gordon, both of 4908 South Shore Drive, New Port Richey, Fla. 34652

[21] Appl. No.: 08/931,633

[22] Filed: Sep. 16, 1997

[51] Int. Cl.$^6$ .............................. A01M 1/02; A01M 1/20
[52] U.S. Cl. ........................................... 43/131; 43/132.1
[58] Field of Search .............................. 43/107, 121, 131, 43/132.1

[56] References Cited

U.S. PATENT DOCUMENTS

| | | | |
|---|---|---|---|
| 3,564,750 | 2/1971 | Burgess | 43/107 |
| 3,835,578 | 9/1974 | Basile | 43/132 |
| 3,858,346 | 1/1975 | Bailey | 43/124 |
| 3,940,875 | 3/1976 | Basile | 43/124 |
| 4,043,073 | 8/1977 | Basile | 43/124 |
| 4,455,441 | 6/1984 | Prestwich | 568/843 |
| 4,485,582 | 12/1984 | Morris | 43/132.1 X |
| 4,953,320 | 9/1990 | Nelson | 43/121 |
| 5,099,598 | 3/1992 | Carter | 43/132.1 |
| 5,329,726 | 7/1994 | Thorne et al. | 43/124 |
| 5,471,782 | 12/1995 | Brittell | 43/121 |
| 5,555,672 | 9/1996 | Thorne et al. | 43/124 |
| 5,564,222 | 10/1996 | Brody | 43/124 |
| 5,573,760 | 11/1996 | Thorne et al. | 424/84 |
| 5,592,774 | 1/1997 | Galyon | 43/124 |
| 5,609,879 | 3/1997 | Myles | 424/410 |
| 5,746,021 | 5/1998 | Green | 43/132.1 X |

*Primary Examiner*—Robert P. Swiatek
*Attorney, Agent, or Firm*—Joseph C. Mason, Jr.; Dennis G. LaPointe

[57] ABSTRACT

A device and method of termite detection and control, where the device is a housing having an interior, and an upper and lower end, and the housing is adapted to capture the natural thermal radiation of the sun when implanted into the ground. The lower end of the housing has an opening to the interior for access by termites when the lower end of the housing is implanted within the ground. The upper end of the housing includes an opening and a transparent cover for placing a moisture-absorbing attractant and, selectively, a poisoned bait, within the interior, and the attractant is visible through the cover. During the day, the device uses the thermal radiation of the sun to heat the attractant which absorbs moisture from the soil. At night, the attractant releases the moisture into the soil, creating a temperature anomaly readily detectable by termites. The method for termite detection and control is placing the housings around an area designated to be protected from termite damage, visually inspecting the attractant within the interior of the housing to determine if termite activity is present without physically disturbing the termites, and placing poisoned bait within the interior through the opening at the upper end of the housing if termite activity is detected.

17 Claims, 2 Drawing Sheets

DEVICE AND METHOD FOR TERMITE DETECTION AND CONTROL

BACKGROUND OF THE INVENTION

1. Field of the Invention

The present invention relates generally to systems for subterranean termite detection and control which use housings with transparent covers that contain termite attractants and selectively, poisoned bait.

2. Description of the Related Art

The prior art as is best known to the inventor is comprised of a variety of systems for detection and control of termites, including housings which are implanted into the ground, and contain either attractant or bait. U.S. Pat. No. 5,329,726 to Thorne et al., teaches a below ground housing for termite detection and control.

Thorne further teaches a housing which has a cartridge inserted into the housing, and the cartridge may contain either chemical attractant to determine if termites are present or poisoned bait to kill the termites. However, to inspect the housing of Thorne to see if termites are present, one has to remove the cartridge to visually inspect it. This physically disturbs termite activity such that the termites may abandon the area and later insertion of poison could be ineffective. Further, Thorne shows a two-step method wherein the housing initially contains a non-toxic bait. If termites inhabit the housing, it is removed, and as a second step, toxic bait is inserted into the housing as a second cartridge.

U.S. Pat. No. 5,609,879 to Myles teaches a method, apparatus, and composition for treating social insects, including termites, with a poison and releasing them. Myles discloses a trap for termites comprised of a PVC pipe and cardboard rolled within the pipe. The cardboard can also have a block of wood rolled within its center as a reserve food supply for termites. Myles also discloses and apparatus that uses heat as an attractant and then a repellent.

The ability of termites to recognize the temperature anomalies is known in the art. "Location of Food Sources by Subterranean Termites," Ettershank, Ettershank & Whitford, J. Env. Entomol. 9:645–648 (1980), surmises an ability of subterranean termites to recognize dung pats, a preferred food source, through a temperature anomaly created by the shadow cast by the dung pat. The article supports a finding that food sources above the ground are more likely to be targeted by foraging termites, rather than subterranean food sources. Further, the article does not teach what temperature anomaly attracts the termites, as it only speculates that the cooler shadow of the dung pat on the underlying soil is the anomaly detected by the termite.

SUMMARY OF THE INVENTION

The present invention is a device and method of termite detection and control, where the device is a housing having an interior, and an upper and lower end, the lower end of the housing has an opening to the interior for access by termites when the lower end is implanted within the ground, the housing is further adapted to capture the natural thermal radiation of the sun when partially implanted into the ground; the upper end of the housing includes an opening and a transparent cover for selectively placing a moisture-absorbing attractant and, selectively, a poisoned bait, within the interior, and the attractant is visible through the cover. The thermal radiation of the sun causes the attractant to absorb moisture from the soil during the day, and the attractant releases moisture into the soil at night, thereby creating a temperature anomaly. The method of this invention for termite detection and control is the placing of the housings at least partially into the ground around an area designated to be protected from termite damage, visually inspecting the attractant within the interior of the housing to determine if termite activity is present without physically disturbing the termites, and placing poisoned bait within the interior through the opening at the upper end of the housing if termite activity is detected.

Accordingly, the primary object of the present invention is to provide a device and method for termite detection and control which uses thermal radiation of the sun to heat a moisture-absorbing attractant such that it absorbs moisture from the soil during the day and releases the moisture into the soil at night to create a temperature anomaly that termites can easily detect and the termites will therefore be drawn into the device.

It is a further object of the present invention to provide a device and method for termite detection and control where the device can be visually inspected to determine if termites are present, and poisoned bait may be added without disruption of the termites.

The above and yet further objects and advantages of the present invention will become apparent from the hereinafter set forth Brief Description of the Drawings and Detailed Description of the Invention.

DETAILED DESCRIPTION OF THE INVENTION

Figure 1:
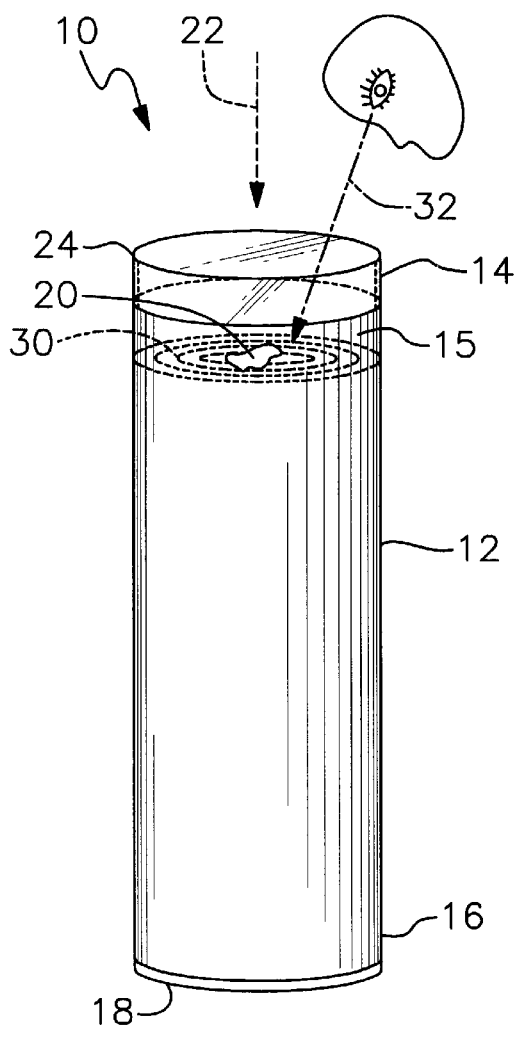
FIG. 1 is a side perspective view of the device for termite detection and control.

The present invention is a device and method for termite detection and control. As shown in FIG. 1, the device 10 is a housing 12 comprised of an upper end 14 and lower end 16. The device 10 is implanted into the ground 31, as shown in FIG. 2.

The housing 12 has an interior 15 and a bottom opening 18 to the interior 15 on the lower end 16, such that termites can enter the interior 15, as shown by direction 33, when the device 10 is partially implanted in the ground. The housing 12 is preferably 3 inches in diameter and 6 inches in length, although other dimensions may be used. However, the smaller the device, the lesser the temperature anomaly the device creates, and thus, will be less attractive to termites.

Figure 2:
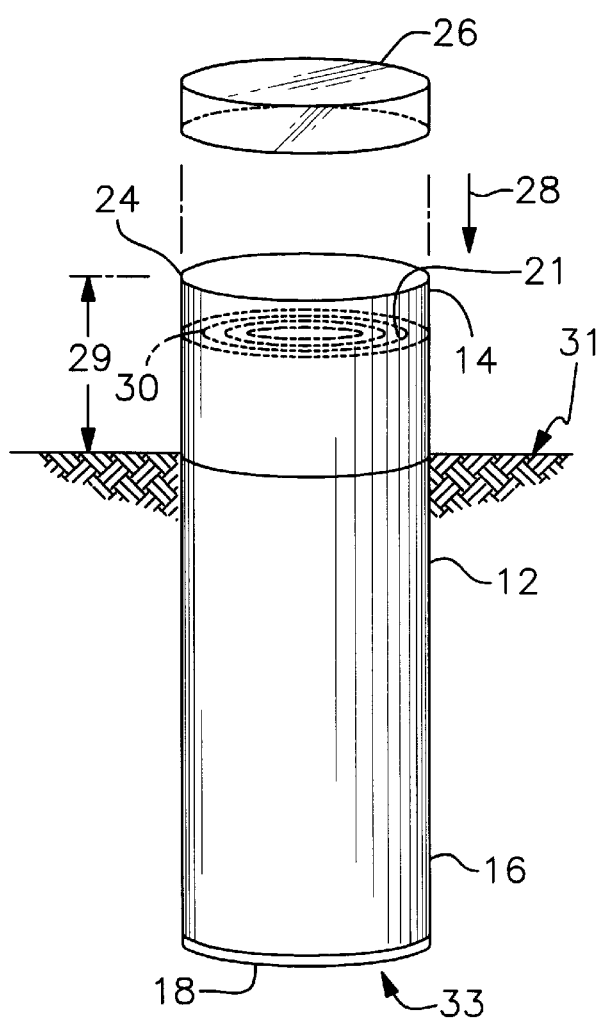
FIG. 2 is a side perspective view similar to FIG. 1, but the device is within the ground and the cover of the device is removed.

As shown in FIG. 2, the housing 12 is preferably placed in the ground 31, with, preferably, one inch protruding above the ground, shown as distance 29. Such protrusion is preferable as the upper end 14 and the top 21 of the attractant 30 can be visually inspected simultaneously. At such height, the housing 12 is also not likely to be hit by a lawn mower passing over.

The housing 12 is preferably made from transparent, high-impact plastic which can endure the exposure to soil and the elements without degrading. Although, the housing need not be transparent. The housing 12 is permanent as it does not have to be removed from the ground, once inserted, to inspect for termites or to poison termites when their presence is detected.

The upper end 14 of the housing 12 includes an opening 24 and a transparent cover 26, which frictionally slides into the interior 15 of the housing 12 at the top 24 of the upper end 14, as shown by direction 28 in FIG. 2. The transparent cover 26 allows one to see into the interior 15 of the housing 12, as demonstrated by line of sight 32 in FIG. 1. Here, the cover 26 is shown as frictionally sliding into the opening 24 in the upper end 14 of the housing. However, the cover 26 may also fit over the opening 24 at the upper end 14 of the housing 12 to prevent rain and sprinkler water from getting into the device 10. Alternatively, the upper end 14 can be completely closed, however, it is important that the attractant 30 still be visible through the closed upper end 14.

It is preferred that the housing 12 be particularly designed such that the upper end 14 and cover 26 harness heat from a heating means, shown here as the natural thermal energy of the sun 22, thereby heating the interior 15 and a moisture-absorbing attractant 30 therein.

The attractant 30 should be able to utilize the thermal radiation of the sun 22 to absorb moisture from the soil during the day. Then at night, the attractant 30 releases the moisture into the soil, creating a temperature anomaly as the evaporating water makes a cool "wet spot" which termites can readily detect. Further, the temperature anomaly exaggerates the size of the device 10 to the termite, making the termite believe that device is an excellent source of food and thus, more likely to have the termite colony invade the device 10.

A preferred attractant 30 is rolled cardboard. This is because the cardboard has excellent moisture absorption capability, as well as being a good food source for termites. Furthermore, the cardboard has longitudinal tubes which are visible at the top of the roll 21. When termites attack the device 10, they travel to the top of the tubes 21 and place dirt and other filler to block the tubes. This activity is easily visible through line of sight 32 and therefore, makes detection of the termites much easier.

Other attractants may also be used either with or instead of the roll of cardboard. Cow dung 20 makes an excellent attractant as it is a preferred food source for termites. The use of cow dung captures nitrogen rich moisture from the soil, and fosters naturally occurring microbes, fungal spores and beneficial nest mates of termites. Wood may also be wrapped within the cardboard to provide additional food for termites to forage when the cardboard is completely consumed.

An important feature of the present invention is that the transparent cover 26 allows inspection of the attractant to see if termites are present, without disturbing the device 10 or the attractant 30. Termites are known to leave an area when the soil is disturbed, and leave a pheromone warning signal for other termites to avoid the area. Thus, in the prior art devices, the device or a cartridge thereof had to be removed to be inspected for termite activity. The disturbance causes the termites to send a signal to the colony to leave the area, and thus, leave the device. When the poisoned bait is inserted into the device, through cartridges, the termites have already fled and the effectiveness in controlling the termites is greatly lessened.

The present inventive device does not suffer this problem, as it can be determined through simple visual inspection 32 that termites are present. Then, as shown in FIG. 2, the cover 26 can be lifted and poisoned bait may be inserted into the interior 15, without any disturbance of the termites.

Consequently, the termites will not flee the device 10 and any poisoned bait inserted will have its full effectiveness in controlling the termites. Although, the poisoned bait may be contained within or inserted contemporaneously with the attractant 30 such that a separate step of insertion is not necessary.

The poisoned bait should be a slow acting toxicant such that the termites will take the toxicant back to other members of the colony for consumption, thus causing effective destruction of the entire colony. Examples of poisons which are useful in the present invention include organic compounds such as fluoroaliphatic sulfonamides such as sulfluramid and their relates sulfonic acid analogues, amidinohydrazones such as hydramethylnon, avermectin, silafluofen, glycol borate esters, and dihaloalkyl suflones. These toxicants should be used in small amounts, at the most 0.01% to 0.5% by weight, because any higher amount of toxicant may repel the termites. Alternatively, insect-growth regulators, termitic pathogens, termitic parasites, or metabolic inhibitors could be used for the poisoned bait.

Figure 3:
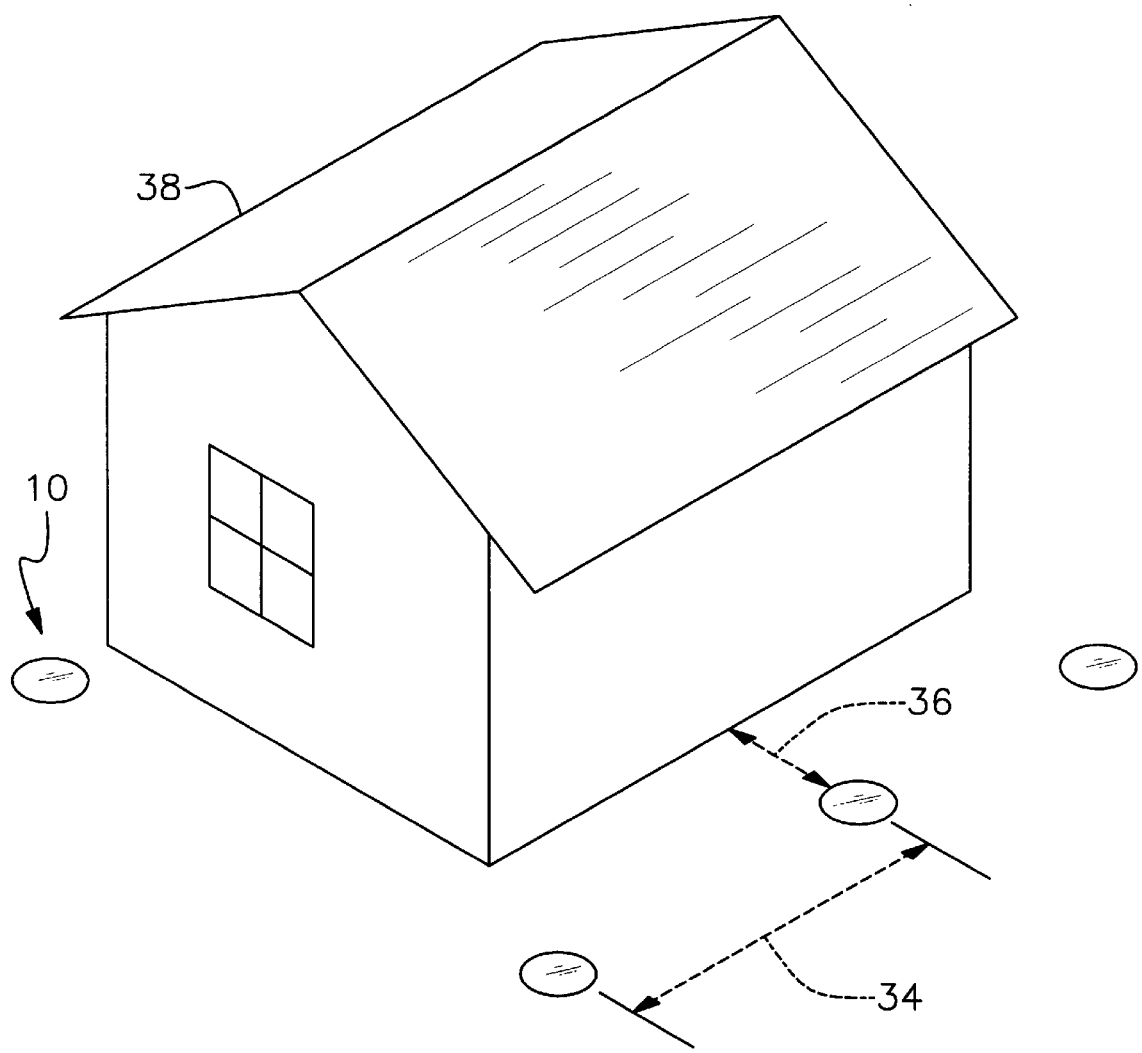
FIG. 3 is a perspective view of the devices being used in the present inventive method to protect a building from termites.

The recommended method of use of the present device 10 to detect and control termites particularly around a building 38 is shown in FIG. 3. The devices 10 should be placed between 2 to 3 feet from the foundation of the building 38, shown by distance 36. The devices 10 should also be placed no greater than 20 feet apart from each other, shown by distance 34. By such placement, the devices 10 should attract any foraging subterranean termites prior to the entry into the foundation of the building 38, or attract termites already within the building 38.

Once termites are seen in the interior 15 of the housing 12, poisoned bait may be placed into the interior 15, if not already present, and the termites, undisturbed, should transport the poison to the entire colony such that the entire colony will be destroyed. This method controls termites reaching the building 38 as well as termites already within the building 38 as the attractant 30 is particularly alluring to a foraging termite so that a termite may stray from the building 38 in order to eat the attractant 30.

Two or three of the devices 10 may also be concentrated in an area particularly conductive for termite infestations, such as excessive moisture sources near foundations, wooden mulched flower beds, dead tree stumps, and other wood-to-ground contact areas like fence posts.

While there has been shown a preferred and alternate embodiments of the present invention, it is to be understood that certain changes may be made in the form and arrangement of the elements of without departing from the underlying spirit of the invention as particularly set forth in the Claims.

What is claimed is:

1. A device for termite detection and control for implanting into the ground, comprising:

a longitudinal uniformly cylindrically-shaped housing having an interior, and an upper and lower end;

the upper end of the housing including an opening to the interior and a removable cover frictionally engageable and fitted about the opening;

the lower end of the housing having at least one opening to the interior for access by termites;

the upper end of the housing being semi-transparent; and a moisture-absorbing attractant and a poisoned bait within the interior, the attractant being visible through the upper end of the housing, whereby the natural thermal radiation of the sun through the cover and the semi-transparent housing heats the attractant so as to cause the attractant to absorb moisture from the ground during the day and whereby the attractant releases the moisture into the ground at night as the attractant cools, thereby creating a temperature anomaly detectable by termites.

2. The device according to claim 1, wherein the housing is transparent and the cover is transparent.

3. The device according to claim 1, wherein the attractant is rolled cardboard.

4. The device according to claim 1, wherein the attractant is cow dung.

5. The device according to claim 1, wherein the poisoned bait is a slow acting toxicant.

6. The device according to claim 1, wherein the poisoned bait is a termitic parasite.

7. A method of termite detection and control, comprised of placing devices into the ground around an area designated to be protected from termite damage, each device comprised of a longitudinal housing having an interior, and an upper and lower end; the lower end of the housing having at least one opening to the interior for access by termites; the upper end of the housing being semi-transparent; and a moisture-absorbing attractant and a poisoned bait within the interior, the attractant being visible through the upper end of the housing, whereby the natural thermal radiation of the sun through the semi-transparent upper end of the housing heats the attractant so as to cause the attractant to absorb moisture from the ground during the day and whereby the attractant releases the moisture into the ground at night as the attractant cools, thereby creating a temperature anomaly detectable by termites.

8. The method according to claim 7, wherein the devices are placed in a perimeter around a building desired protected, approximately 2 to 3 feet from the foundation, and no greater than 20 feet apart from each other.

9. The method according to claim 7, wherein 2 to 3 devices are concentrated in an area conductive for subterranean termite infestations.

10. A method of termite detection and control, comprising:

placing devices into the ground around an area designated to be protected from termite damage, each device comprised of a housing having an interior, and an upper and lower end, the housing further adapted to capture the natural thermal radiation of the sun with the lower end is partially implanted within the ground; the lower end of the housing having at least one opening to the interior for access by termites when the lower end is implanted into the ground; and the upper end of the housing including an opening and a transparent cover for placing a moisture-absorbing attractant within the interior, the attractant being visible through the cover, whereby the thermal radiation of the sun causes the attractant to absorb moisture from the ground during the day and the attractant releases the moisture into the ground at night, thereby creating a temperature anomaly detectable by termites;

visually inspecting the attractant within the interior of the housing to determine if termite activity is present without physically disturbing the termites; and placing poisoned bait within the interior through the opening at the upper end of the housing if termite activity is detected.

11. The method according to claim 10, wherein each housing is transparent.

12. The method according to claim 10, wherein the attractant in the housing is rolled cardboard.

13. The method according to claim 10, wherein the attractant in the housing is cow dung.

14. The method according to claim 10, wherein the devices are placed in a perimeter around a building desired protected, approximately 2 to 3 feet from the foundation, and no greater than 20 feet apart from each other.

15. The method according to claim 10, wherein 2 to 3 devices are concentrated in an area conductive for subterranean termite infestations.

16. The method according to claim 10, wherein the poisoned bait is a slow acting toxicant.

17. The method according to claim 10, wherein the poisoned bait is a termitic parasite.

* * * * *